US011208163B2

(12) United States Patent
Freeman

(10) Patent No.: US 11,208,163 B2
(45) Date of Patent: Dec. 28, 2021

(54) SEAL GUARD FOR CRAWLER

(71) Applicant: Ernie Freeman, Rocky River, OH (US)

(72) Inventor: Ernie Freeman, Rocky River, OH (US)

(73) Assignee: Ernie Freeman, Rocky River, OH (US)

( * ) Notice: Subject to any disclaimer, the term of this patent is extended or adjusted under 35 U.S.C. 154(b) by 250 days.

(21) Appl. No.: 16/554,835

(22) Filed: Aug. 29, 2019

(65) Prior Publication Data

US 2021/0061378 A1  Mar. 4, 2021

(51) Int. Cl.
*B62D 55/088* (2006.01)
*B62D 25/16* (2006.01)
*B60B 27/04* (2006.01)

(52) U.S. Cl.
CPC .......... *B62D 55/0887* (2013.01); *B60B 27/04* (2013.01); *B62D 25/165* (2013.01)

(58) Field of Classification Search
CPC B62D 55/0887; B62D 55/088; B62D 25/165; B60B 27/04
See application file for complete search history.

(56) References Cited

U.S. PATENT DOCUMENTS

| 6,231,136 | B1 | 5/2001 | Freeman | |
|---|---|---|---|---|
| 6,293,631 | B1 | 9/2001 | Freeman | |
| 6,371,578 | B1 * | 4/2002 | Ferguson | B62D 55/0845 305/107 |
| 7,946,661 | B1 | 5/2011 | Freeman | |
| 8,020,874 | B2 * | 9/2011 | Kometani | B62D 55/088 277/348 |
| RE45,491 | E | 4/2015 | Freeman | |
| 2011/0148188 | A1 * | 6/2011 | Larson | B62D 55/12 305/107 |
| 2019/0276100 | A1 * | 9/2019 | Tokach | B62D 55/088 |

FOREIGN PATENT DOCUMENTS

| WO | WO-2016066589 A1 * | 5/2016 | ............ B62D 55/12 |
|---|---|---|---|
| WO | WO-2019106358 A1 * | 6/2019 | ............ B62D 55/12 |

* cited by examiner

*Primary Examiner* — Jason R Bellinger
(74) *Attorney, Agent, or Firm* — Pearne & Gordon LLP

(57) ABSTRACT

A final drive seal guard for a track-type tractor including a base component adapted to be stationarily fixed to the tractor and to surround a portion of a spindle housing of the final drive, a sprocket component adapted to be carried on and surround a portion of a sprocket hub of the final drive that rotates about an axis, and an intermediate component adapted to be bolted over the exterior of one of said base and sprocket components and surround portions of both of said base and sprocket components, the intermediate component and another of said base or sprocket components being mutually arranged to form a radially extending sealing gap at a potential path of debris into the guard at a location free of a relatively long axial gap upstream in said potential path.

7 Claims, 5 Drawing Sheets

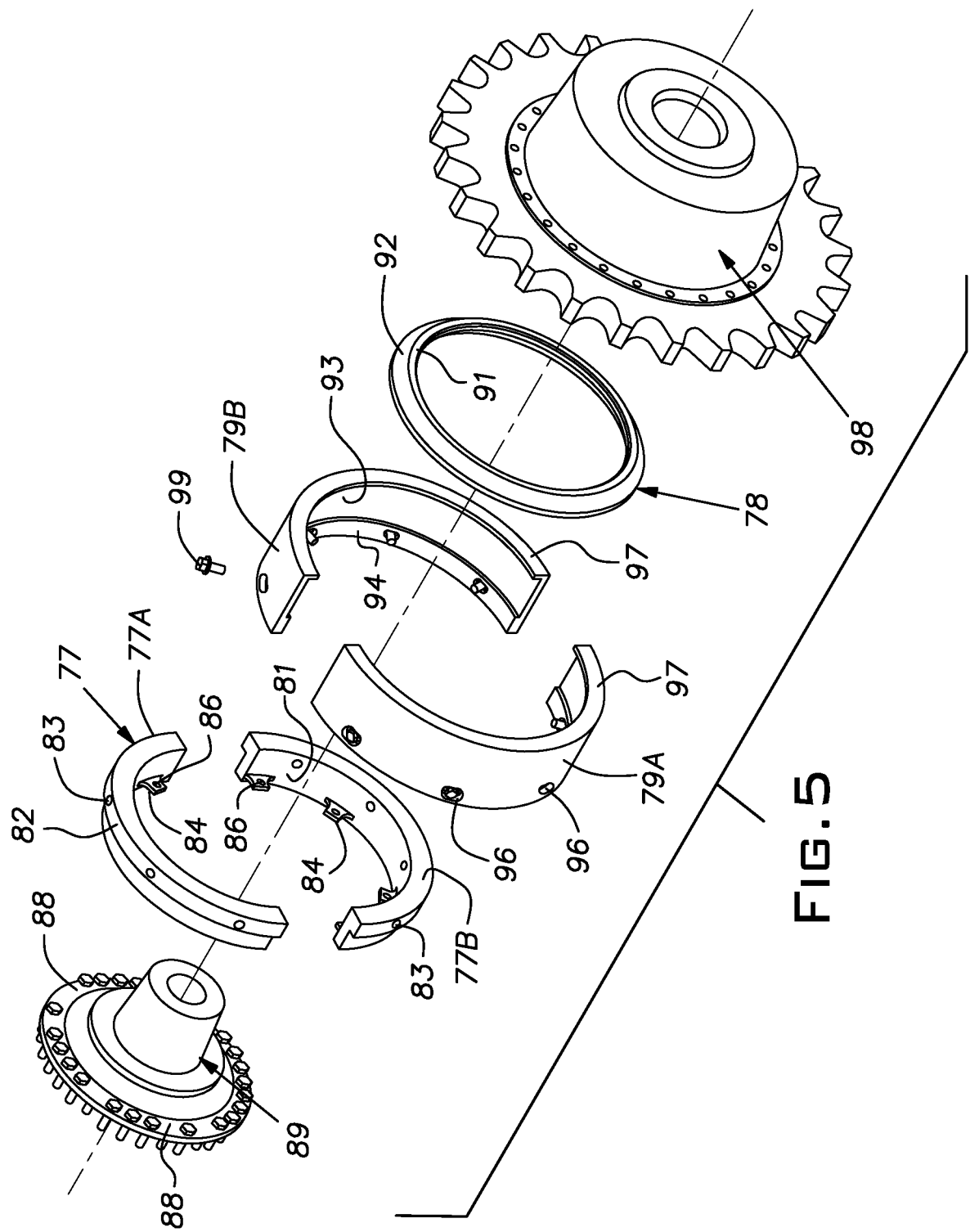

SEAL GUARD FOR CRAWLER

BACKGROUND OF THE INVENTION

The invention relates to final drive seal guards for track-type tractors.

PRIOR ART

Track-type tractors or "crawlers" when operating in landfills, especially, are prone to accumulate debris around a seal between a stationary spindle housing and a rotating sprocket hub driving the track. The debris, particularly cable, wire and the like, can be drawn into the seal area and cause the seal to fail, leading to expensive repairs. Debris, additionally, can accumulate around the seal area and cause destructive abrasion as well as unnecessary power consumption and excessive drive component wear.

U.S. Pat. Nos. 6,231,136, 6,293,631, and 7,946,661 disclose examples of prior art seal guards particularly useful in adverse environments such as in landfills. The guards disclosed in these patents have demonstrated significant improvement in the operation of tractors in landfill applications. Modifications of some of these guards in attempts to improve their effectiveness have met with limited success. For example, encircling the cylindrical groove sealing area of the guard of U.S. Pat. Nos. 6,231,136 and 6,293,631 with axially extending cylindrical half-sleeves, radially bolted to the guard exterior has demonstrated a tendency of debris to migrate into primarily axially extending clearances or gaps. Axially telescoped guard components of the prior art, if distorted by random impacts during service for example, can be difficult or nearly impossible to separate and/or reassemble.

SUMMARY OF THE INVENTION

The guard of the present invention has improved sealing performance and serviceability obtained with primary outer guard elements that provide an initial radially extending sealing gap and that are radially installed and retained. The radial sealing gap between rotating and non-rotating parts of the seal guard has a reduced tendency to accumulate and/or be abraded by debris.

An outer component part of the guard proper is installed radially on a guard base component. This feature allows the outer component part to be drawn against the base component with radially oriented mounting bolts. If the outer component part is distorted during service it is not ordinarily difficult to remove for repair or replacement. If not perfectly repaired to the original configuration, the outer component part can be readily forcibly drawn into an operable installed position by tightening of the mounting bolts.

In the disclosed preferred embodiments, the guard has three annular components each of which is or can be diametrically split. A stationary or base component is fixed to the tractor frame, a rotating component is fixed to the sprocket hub and an intermediate cover component bridging over the base and rotating components is fixed to the base component. Ideally, the intermediate cover component has counterbored holes for receiving and protecting the heads of associated mounting bolts.

BRIEF DESCRIPTION OF THE DRAWINGS

FIG. 5 is an exploded perspective view of the final drive and seal guard of FIG. 4.

DESCRIPTION OF THE PREFERRED EMBODIMENTS

Figure 1:
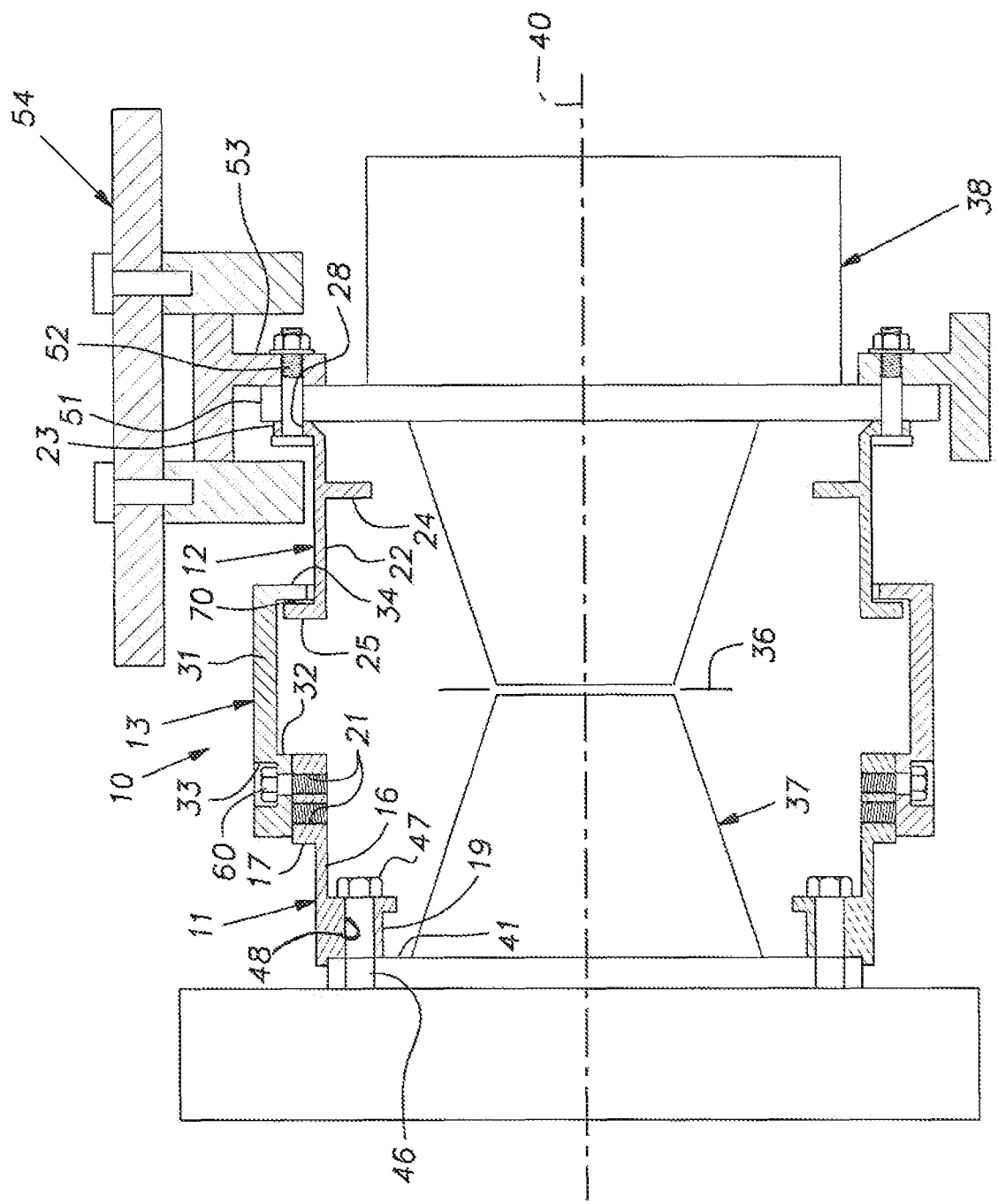
FIG. 1 is a diagrammatic view of a final drive area of a track-type tractor and a first embodiment of the seal guard of the invention.
Figure 2:
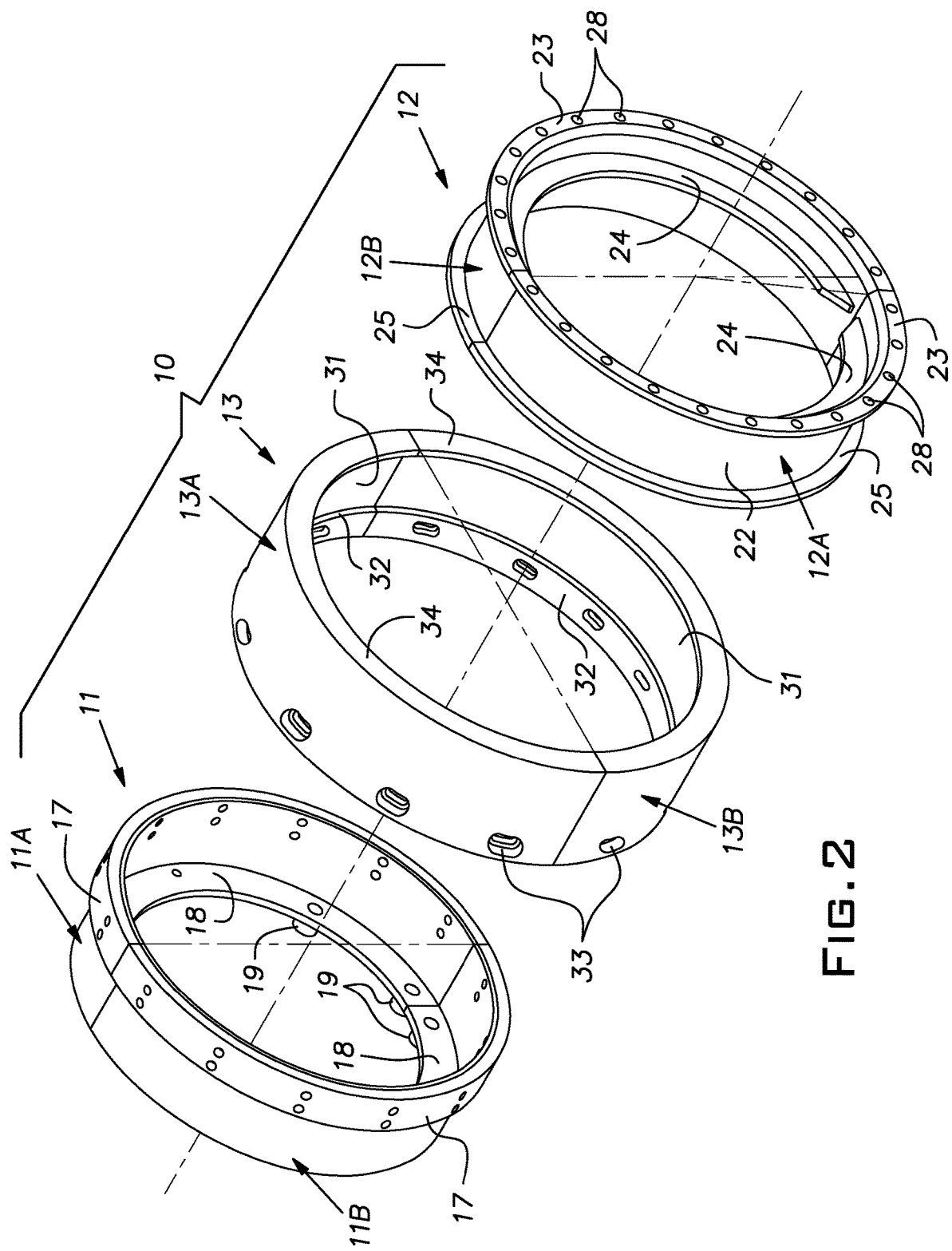
FIG. 2 is an exploded perspective view of the guard of FIG. 1.
Figure 3:
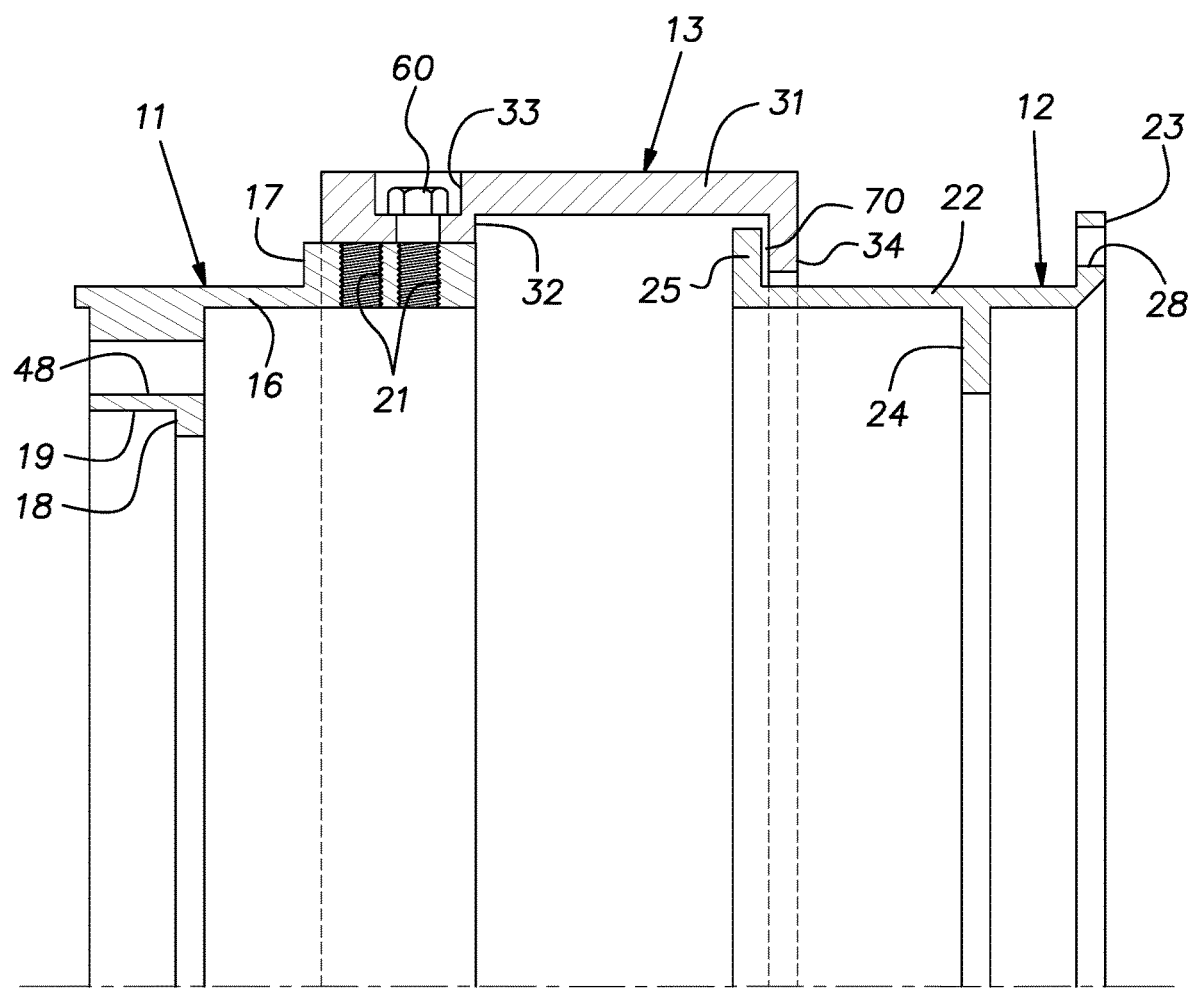
FIG. 3 is a somewhat schematic enlarged cross-sectional view of a half of the guard of FIG. 1.

Referring to FIGS. 1-3, a first embodiment of a seal guard 10 is illustrated. It will be understood that the following descriptions are of guards at one machine side and that the guard for the opposite machine side is symmetrical about a vertical plane. The illustrated guard 10 is suitable for use on Caterpillar® Models D5-D11 and, for example, a D6XE.LGP. The guard 10 for each machine side comprises three annular components 11-13, each of the components preferably being diametrally split to enable the guard 10 to be installed while the respective final drive remains assembled. The components are preferably fabricated as unitary cast steel parts. The component or base 11 on the left in FIGS. 1-3 comprises two generally semi-circular parts 11A, 11B. The base parts 11A, 11B each include a cylindrical wall 16 having an external or radially stepped-out rim 17 providing increased thickness and a radially extending internal flange 18 both essentially co-extensive with the arcuate length of the wall 16. Integral with the wall 16 and flange 18 are a plurality of axially oriented angularly spaced apertured bosses or lugs 19.

The external rim 17 has a plurality of circumferentially or angularly spaced internally tapped radially oriented holes 21. In the illustrated case, the holes are arranged in axially spaced pairs as explained below.

Axially away from the base component 11, the guard 10 includes a sprocket side component 12, hereafter sprocket component, formed of two semi-circular parts 12A, 12B of essentially the same construction. The sprocket component part 12A, 12B includes a semi-cylindrical wall 22 with a radially outwardly extending mounting flange 23, a radially inwardly extending stiffening flange 24 and a radially outward sealing flange 25 distal from the mounting flange 23. Preferably, the flanges 23, 25 are each continuous along the arcuate extent of the respective wall 22. Regularly spaced, axially oriented holes 28 are provided in the mounting flange 23.

An intermediate component 13 bridges over the base and sprocket components and comprises semicircular two parts 13A, 13B. An intermediate part 13A, 13B has a semi-cylindrical wall 31 preferably with an inwardly projecting peripheral rim 32 adjacent one end. The wall 31 and rim 32 are formed with arcuately spaced, radially oriented counterbores 33 which, as shown, can be somewhat oval shaped.

A plane 36 between a spindle housing 37 and sprocket hub 38 is sealed by a mechanical seal, sometimes known in the industry as a duo cone seal developed by Caterpillar® within the spindle housing 37 and sprocket hub 38. The seal is susceptible to damage when wire or like material winds around this zone and is drawn into the seal. A damaged seal can lead to catastrophic failure of internal parts of the final drive. The spindle housing 37 and sprocket hub 38 including their internal components are sometimes referred to as the final drive of a track-type tractor, it being understood that these assemblies ordinarily exist on the left and right sides of a tractor. The guard 10 reduces the risk of seal failure by excluding debris from the seal area or zone between the spindle housing 37 and sprocket hub 38. The non-rotating spindle housing 37 has a peripheral flange 41 bolted to the tractor frame. The sprocket hub 38 is rotationally supported on the spindle housing 37.

Axially oriented holes 48 in the base component 11 match up with a limited number of the spindle hub mounting holes and associated internally threaded holes in the tractor frame.

The guard 10 is assembled around the final drive by bolting the base component 11 on the tractor frame. Bolts 47 are assembled through the holes 48 alignable with certain of the factory bolt holes existing in the spindle housing flange 41 and tractor frame. The original factory bolts at these matching hole centers are previously removed and the base component is fixed in place on the frame with longer bolts assembled through the holes 48 in the bosses 19. It will be understood that the internal flange 18 is spaced from the adjacent edge of the base component and coplanar faces of the bosses 19 to bridge, with clearance, over the heads of original bolts remaining in place and retaining the spindle housing in place.

The sprocket component 12 is fixed to a rotating flange 51 of the sprocket hub 38 with substitute bolts 52 assembled in holes 28 in the mounting flange 23, sprocket hub 38 and sprocket segments 53.

With the base and sprocket components 11, 12 in place, the intermediate component 13 is assembled on the base component with radially oriented bolts 60 received in the counterbored or milled holes 33 in the intermediate component and the threaded holes 21 in the base component parts 11A, 11B. The inboard or outboard base component holes 21 are selected depending on the final drive width of the model tractor on which the guard is installed.

The intermediate component 13 effectively closes off the space surrounding the separation plane 36 and associated internal seal between the spindle housing 37 and sprocket hub 38. The radially outward extending sealing flange 25 of the sprocket component 12 and inwardly extending flange 34 of the intermediate component establish a relatively narrow sealing gap 70 in a generally radial plane. This gap 70 can initially range between a rubbing fit of essentially zero clearance to about 1/16 inch. The radial length of the gap 70 is longer than the axial length or width of a gap between the flange 34 and wall 22.

Note that reference to axial and radial directions are with respect to the axis of rotation of the sprocket hub indicated at 40.

The track of the tractor is indicated at 54.

Preferably, joints between the half parts of the base 11 and intermediate component 13 are offset by 90 degrees as indicated in FIG. 2.

Figure 4:
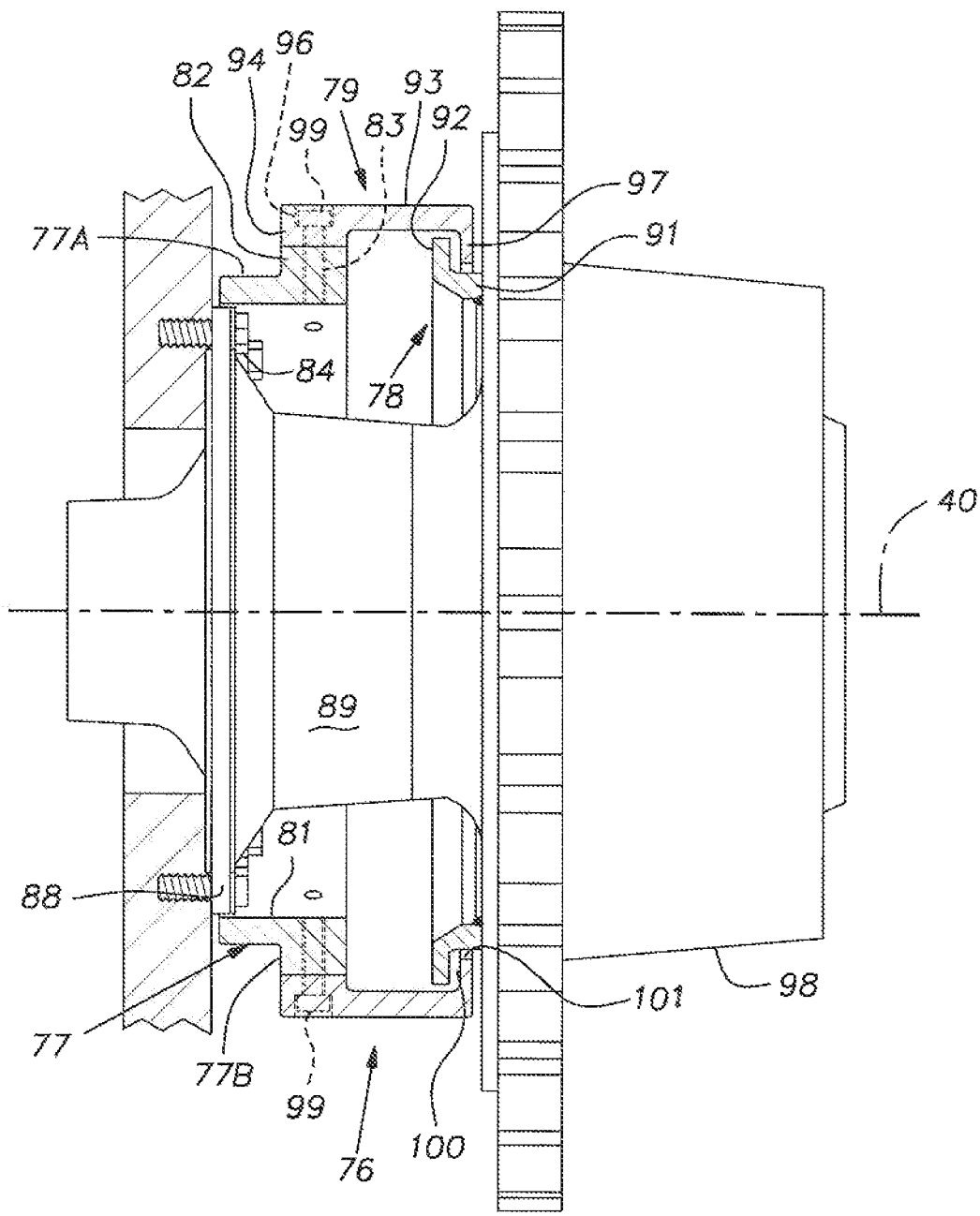
FIG. 4 is a schematic view of a final drive area of another track-type tractor and a second embodiment of the seal guard of the invention.

Referring to FIGS. 4 and 5, there is shown a second embodiment of the inventive guard 76 useful with Caterpillar® Models D5K and D6K, for example. As with the embodiment of the guard 10 previously described, the guard comprises three components: a base component 77, a sprocket component 78 and an intermediate component 79. These components are symmetrically replicated for installation on the final drive of an opposite side of a tractor. In this second embodiment, the base and intermediate components 77, 79 each comprise two semicircular parts 77A, 77B and 79A, 79B while the sprocket component 78 is a unitary annulus or ring.

The base component parts 77A, 77B each has a semi-cylindrical wall 81 and a radially outwardly extending integral rim 82 on an outboard end. The rim 82 has radially oriented internally threaded holes 83. A plurality of angularly spaced integral tabs 84 extend radially inwardly from the wall 81. The tabs 84 have axial holes 86 that align with bolt holes in a flange 88 of a spindle housing 89.

The sprocket component 78 includes a short cylindrical wall 91 and an integral radially outwardly extending flange 92.

The intermediate component parts 79A, 79B each have a semi-cylindrical wall 93. At one end, the wall 93 has an integral radially inwardly directed rim 94 with an inside radius substantially the same as the outside radius of the base rim 82 and angularly spaced counter-sunk radially oriented holes or slots 96 alignable with the threaded holes 83. At the opposite end, the wall 93 has an integral radially inwardly directed flange 97 with an inside radius slightly larger than the outside diameter of the sprocket component wall 91.

The guard 76 is installed on the final drive on each side of a tractor. Installation is accomplished by removing the sprocket hub, designated 98, from the spindle housing 89. The base component parts 77A, 77B are preferably installed after removal of the sprocket hub 98, there being greater working space at this time, although this step can be done prior to removal of the sprocket hub. The base component 77 is fixed to the tractor by removing certain ones of the factory spindle hub mounting bolts, aligning the tab holes 86 with the hub flange holes and assembling substitute longer bolts into the tab holes, spindle hub flange holes and threaded holes in the tractor frame. While the base component 77 is described as being diametrally split, it may be provided as a one-piece annular unit.

The sprocket component 78 is stitch welded on the inner side of the sprocket hub 98 with the flange 92 away from the sprocket hub. Care is taken to assure that the sprocket component 78 is concentric with the axis or center of the sprocket hub 98.

With the base component part 77A, 77B bolted on the spindle flange 88 and the sprocket component 78 welded in place, the sprocket hub is reassembled on a spindle housing. The intermediate component parts 79A, 79B are assembled over the base and sprocket components 77, 78. The intermediate component parts 79A, 79B are fixed on the base component 77A, 77B, preferably with no gaps and with their joints 90 degrees out of alignment with the joints of the base component parts, with radially oriented bolts 99 assembled in the counterbored holes or slots 96 and threaded radial holes 83.

The various parts of the guard are proportioned so that the inwardly extending radial flange 97 of the intermediate component parts 79A, 79B form a small sealing gap 100 in a radial plane with the outwardly extending radial flange 92 of the sprocket component 78. The sealing gap 100 can initially range from a rubbing fit of zero clearance to about 1/16 inch. An axially extending gap 101 between the intermediate component flange 97 and the sprocket component wall 91 can range between a slight rubbing fit to a gap of about 1/16 inch. As shown, the axial length of the gap 101 is less than the radial length of the radial sealing gap 100.

Both of the above-described guards 10, 76 have improved resistance to the ingress of debris. Each provide a radial sealing gap without an appreciable upstream, axially oriented gap of equal or greater length in a path for debris migrating into the guard interior. It has been found that gaps of appreciable axial length particularly at the beginning of a path into the guard are prone to accumulate debris which accelerates abrasive wear and enlarges the transverse section or size of the axially oriented gap thereby losing effectiveness in excluding debris.

The disclosed guards if distorted by impact during use are easier to disassembly than prior art arrangements where the parts are axially telescoped within one another. Still further, the outer guard components, 13, 79, if distorted in use, can be removed and brought back to shape and reinstalled. The radially oriented bolts 60 and 99 greatly assist in reinstallation even if the components are slightly misshapen because tightening the bolts tends to draw the components into registration. Moreover, the countersunk holes or slots which receive the heads of the bolts 60, 99 eliminates the tendency in prior art guards of debris, particularly wire or other strands of material, to be snagged by a bolt head and precipitate the build-up of debris on a guard.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A final drive seal guard for a track-type tractor comprising a base component adapted to be stationarily fixed to the tractor and to surround a portion of a spindle housing of the final drive, a sprocket component adapted to be carried on and surround a portion of a sprocket hub of the final drive that rotates about an axis, and an intermediate component adapted to be radially assembled simultaneously over the exterior of said base and sprocket components and surround portions of both of said base and sprocket components, the intermediate component and another of said base or sprocket components being mutually arranged to form a radially extending sealing gap at a potential path of debris into the guard at a location free of an axial gap longer than the radially extending sealing gap upstream in said potential path.

2. A guard as set forth in claim 1, wherein the intermediate component is fixed to the base component.

3. A guard as set forth in claim 1, wherein the intermediate component includes an inwardly extending radial flange forming one side of said radially extending sealing gap.

4. A guard as set forth in claim 3, wherein the sprocket component includes an outwardly extending radial surface forming a side of said radially extending sealing gap opposite said one side.

5. A guard as set forth in claim 1, wherein the base component is fixed to the tractor with bolts extending through a flange of said spindle housing.

6. A guard as set forth in claim 1, wherein the sprocket component is fixed to said sprocket hub with bolts attaching sprocket elements to said sprocket hub.

7. A final drive seal guard for a track-type tractor comprising a base component adapted to be stationarily fixed to the tractor and to surround a portion of a spindle housing of the final drive, a sprocket component adapted to be carried on and surround a portion of a sprocket hub of the final drive that rotates about an axis, and an intermediate component bolted with radially oriented bolts over an exterior of the base component and surrounding portions of both of said base and sprocket components, the intermediate component having a radially inwardly extending flange arranged to form a radially extending sealing gap with said sprocket component, the flange at a radially inner periphery being free of contact with other elements of the guard and having an axial width less than a radial length of the sealing gap.

* * * * *